H. FARRELL.
AEROPLANE.
APPLICATION FILED JUNE 16, 1911.
1,021,830.
Patented Apr. 2, 1912.
3 SHEETS—SHEET 2.
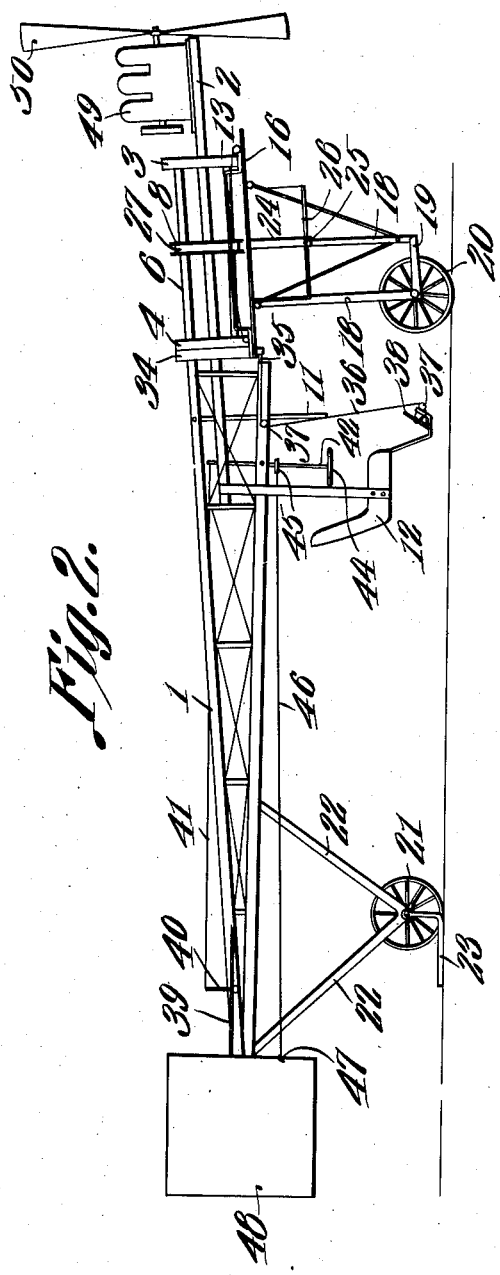
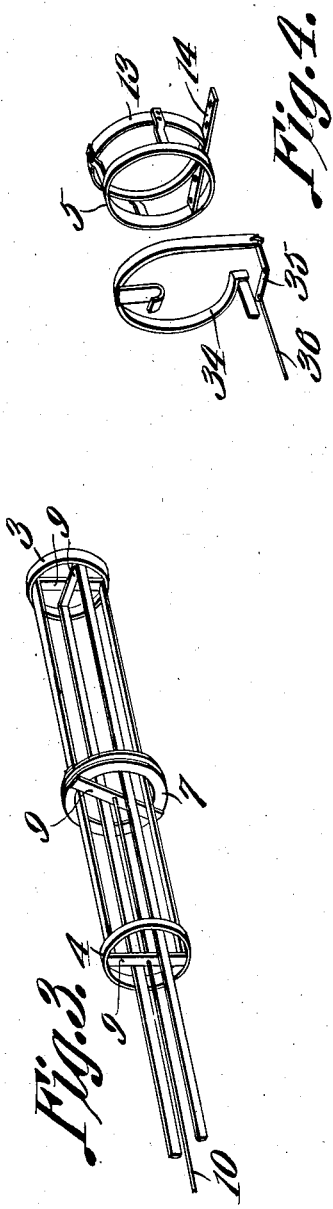
Witnesses
Howard Farrell,
Inventor
by C. A. Snow & Co.
Attorneys

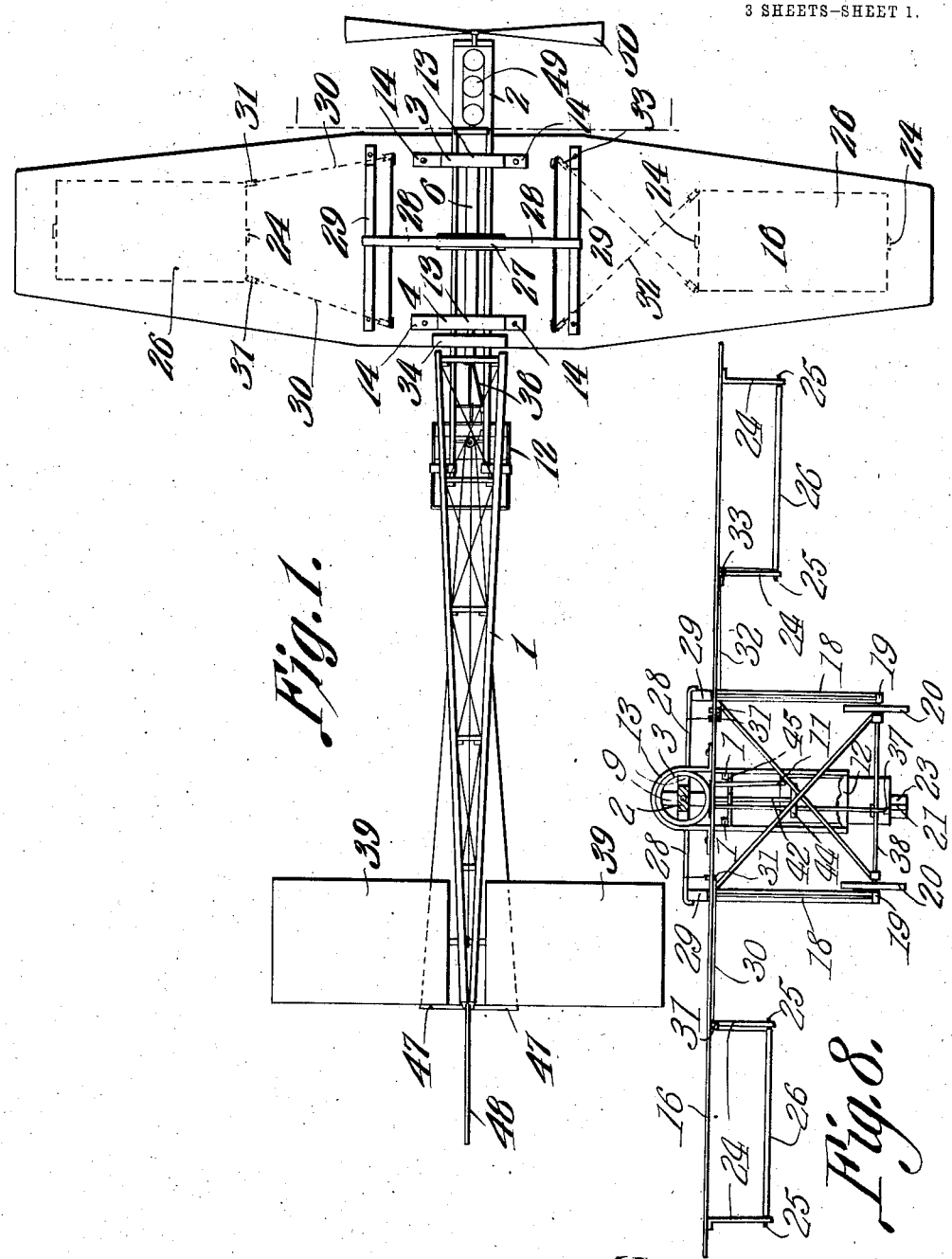

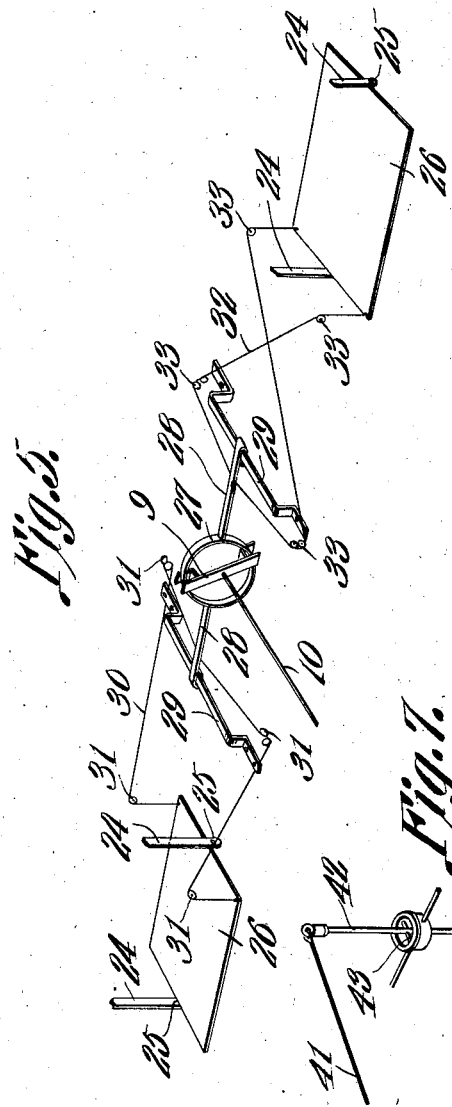
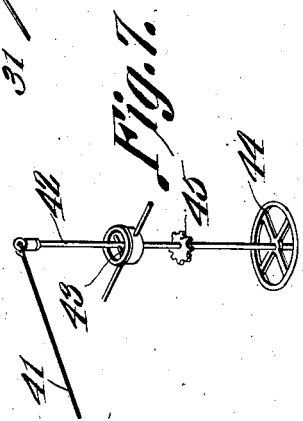
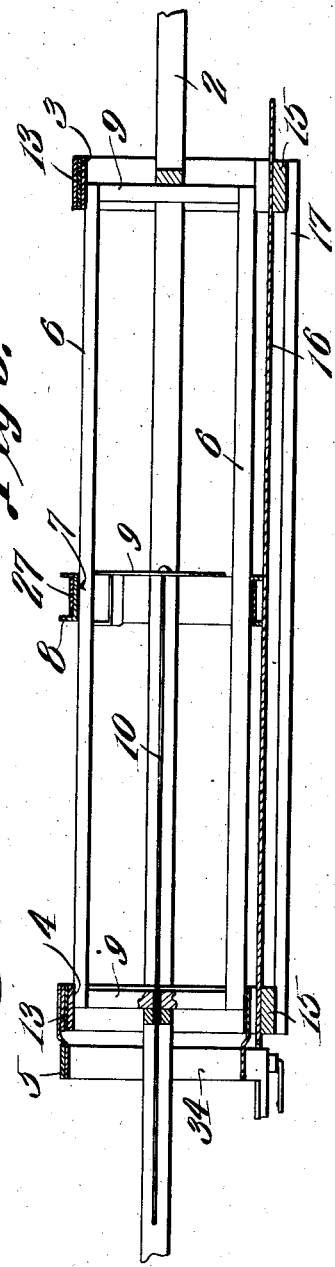

UNITED STATES PATENT OFFICE.

HOWARD FARRELL, OF LESTERSHIRE, NEW YORK.

AEROPLANE.

1,021,830. Specification of Letters Patent. Patented Ap 2, 1912.

Application filed June 16, 1911. Serial No. 633,487.

*To all whom it may concern:*

Be it known that I, HOWARD FARRELL, a citizen of the United States, residing at Lestershire, in the county of Broome and State of New York, have invented a new and useful Aeroplane, of which the following is a specification.

This invention relates to aeroplanes and its principal object is to provide a sustaining plane mounted for rotation about an axis extending longitudinally of the machine whereby, when the machine is subjected to sudden gusts of wind or to other atmospheric disturbances, the sustaining plane is free to rotate about said axis and thus permit the aviator and the mechanism under his control to remain properly balanced until the sustaining plane shall, of its own accord, reassume its proper angle of inclination.

A further object is to provide means under the control of the aviator whereby the sustaining plane may be held against rotation about a longitudinal axis as hereinbefore stated, there being balancing planes carried by the sustaining plane and having mechanism whereby they can be shifted relative to the sustaining plane so as to restore the lateral balance thereof and of the machine when said sustaining plane is held against rotation relative to the main frame of the structure.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the accompanying drawings the preferred form of the invention has been shown. In said drawings:—Figure 1 is a plan view of the machine. Fig. 2 is a side elevation thereof. Fig. 3 is a perspective view of the forwardly projecting portion of the body and on which the sustaining plane is mounted for rotation. Fig. 4 is a detail view of the parts the brake detached. Fig. 5 is a perspective view partly in diagram showing the means for operating the balancing planes. Fig. 6 is a vertical longitudinal section through the central bearing of the sustaining plane. Fig. 7 is a view partly in diagram of the rudder control. Fig. 8 as a front elevation of the machine.

Referring to the figures by characters of reference 1 designates an elongated skeleton frame tapered toward the back end thereof and constituting the body of the machine, this frame being provided with any suitable arrangement of brace wires or the like whereby the same is rendered rigid and capable of withstanding all ordinary strains to which it might be subjected while the machine is in flight.

Parallel spars 2 are extended forwardly from the front end of the body and carry bearing rings 3 and 4 fixed relative thereto. A brake wheel or ring is arranged close to the ring 4, as indicated at 5 but is not designed to rotate therewith. Instead this ring 5 is fixedly connected to the sustaining plane in the manner hereinafter set forth. The rings 3 and 4 may be braced by connecting strips 6 secured at their ends to the rings and a shifting ring 7 is slidably mounted on the spars 2 and the strips 6 at points between the rings 3 and 4 and is annularly grooved, as indicated at 8. Spokes are preferably extended inwardly from the ring 7 and between the spars 2 and strips 6, these spokes being shown at 9, and a rod 10 extends rerawardly from the spokes and through the rings 4 and 5 and thence into the front portion of the body 1 where it is connected to an operating lever 11 or the like. This lever is preferably fulcrumed within the body, 1 and above or close to the aviator's seat 12 which is hung from the front portion of the body and is fixed relative thereto.

Rings 13 are mounted for rotation upon the bearing rings 3 and 4 and each of them has feet 14 extending therefrom and secured upon the middle portions of the front and rear spars 15 of the main sustaining plane 16. These spars are connected by ribs arranged under the fabric of the plane, as ordinarily, and parallel strips 17 also connect the spars adjacent their centers and have standards 18 extending downwardly therefrom, and connected at their lower ends by frame members 19, these standards being all carried by supporting wheels 20 mounted on a common axle connected to the standards 18. Any suitable arrangement of braces may be provided for holding the standards rigidly with relation to the sustaining plane 16 and preferably three supporting wheels and three sets of standards are provided. These wheels and standards serve to support the front end of the machine while traveling over the ground and the rear end portion thereof is supported by a wheel 21 connected to the back portion of the body 1 by upwardly diverging standards 22, there being runners 23 preferably connected to the standards and extending laterally and rearwardly from the wheel so as to prevent the rear portion of the machine from tilting laterally while the machine is traveling over the ground.

Hangers 24 extend downwardly from the sustaining plane adjacent the ends thereof, all of these hangers being disposed on a line extending from side to side of the plane at the center thereof. Each pair of hangers is engaged by trunnions 25 extending laterally from a balancing plane 26 interposed between the hangers.

A ring 27 is mounted for rotation upon the grooved ring 7 and has oppositely extending arms 28 slidably engaging and guided by rails 29 which are fastened upon the plane 16 and extend parallel with the axis of the rings 3, 7, 4 and 5. One of the arms 28 has cords 30 extending in opposite directions therefrom and thence over guide pulleys 31 to the inner corner portions of one of the planes 26. The other arm 28 has cords 32 extending in opposite directions therefrom and thence over guide pulleys 33 to the inner corner portions of the other plane 26, these cords 32 being crossed at any suitable point so that, when the two arms 28 are moved in one direction, the planes 26 will be simultaneously tilted in opposite directions about the axis of their trunnions 25.

A brake band 34 is secured at one end to the front portion of the body 1 and extends loosely around the brake wheel 5 which is secured to the rear ring 13 but preferably lies close to the ring 4. The other end of the brake band is connected to a lever 35, there being a cord 36 or the like extended from this lever and over suitable guide pulleys 37 to an operating lever 38 which may be so located as to be readily moved by the foot of the aviator occupying the car or seat 12. It will be obvious that by pressing forwardly on lever 38, the cord 36 can be caused to shift lever 35 and thus bind the band 34 upon the brake wheel 5. Independent rotation of the brake wheel and band and, therefore of the sustaining plane 16 and the body 1, is therefore prevented as long as the parts are thus held in frictional engagement.

Horizontal rudders 39 are arranged at the sides of the rear portion of body 1 and an arm 40 extends upwardly from the central pivot or shaft of these rudders and is connected, by a rod 41 or the like, to a lever 42 fulcrumed, as at 43 and preferably in the form of a shaft to which the rod 41 is swiveled. This shaft, while capable of swinging upon its fulcrum 43, can also be rotated by means of a hand wheel 44 and a spool 45 or the like is secured to the shaft and has a cord 46 extending rearwardly therefrom to arms 47 extending in opposite directions from the axis of rotation of the vertical rudder 48 which is mounted upon the rear end of the body 1. This hand wheel 44 whereby shaft 42 can be rotated as well as swung, is located at a point where it can be conveniently reached by the aviator.

The engine for driving the machine has been indicated at 49 and is mounted upon the forwardly projecting ends of the spars 2, the propeller 50 being disposed in front of the engine. Any suitable controlling means, not shown, may be provided whereby the operation of the engine may be controlled at will by the aviator.

Under ordinary conditions the brake band 34 is tightened upon the brake wheel 5, thus holding the sustaining plane 16 at a fixed angle relative to the body 1. When the propeller is set in motion, the machine will move forwardly, the upward flight being controlled by the horizontal rudders 39 while the lateral steering of the machine can be effected by means of the vertical rudder 48. When the machine tilts to either side the aviator can elevate the lower side of the plane 16 by shifting lever 11 so as to cause the ring 7 to move in one direction along the spars 2 and the strips 6, thus correspondingly moving the ring 27 and arms 28. Cords 30 and 32 will therefore be shifted so as to raise the front edge of the plane 26 at the lower side of the machine and lower the front edge of the other plane 26. These planes 26 will thus coöperate to displace air in opposite directions and thus restore the lateral balance of the machine. Movement of the parts in the opposite direction will restore the lateral balance of the machine if tilted to the other side. Should the machine suddenly tilt laterally to a dangerous angle which would ordinarily cause upsetting of the machine, the aviator can release the brake wheel 5 whereupon the sustaining plane is free to rotate about the axis of the rings 3 and 4 without upsetting the body 1 which will gravitate to approximately its normal position relative to the horizontal, and the motor on the body will thus be maintained at the proper angle and the aviator will have no difficulty in retaining his position in the car or seat 12. After the plane 16 has been thus shifted independently of the body 1, it can be readily brought back to its proper position by manipulating the balancing planes 26 in the manner hereinbefore described, it being understood that the rotation of plane 16 in no wise interferes with the mechanism provided for shifting the planes 26 relative to the plane 16.

While the present improvements have been shown and described as applied to a monoplane, it is to be understood that they can be used equally as well with other types of aeroplanes. Also, any suitable means, other than those described and shown, may be employed for operating the rudders, and the brake band.

The word "plane" as used in the claims is used to designate a sustaining element of the ordinary or wing type and which has a substantially plane surface extending throughout the length and breadth thereof.

What is claimed is:—

1. An aeroplane including a sustaining plane mounted for complete rotation about an axis extending in the direction of flight, means carried by said plane at opposite sides of its axis for restoring the lateral balance of the plane, and means for shifting said balancing means independently of the sustaining plane and irrespective of the angle of incidence of said plane.

2. An aeroplane including a body, a sustaining plane in front of the body and mounted for complete rotation relative thereto and about an axis extending in the direction of the line of flight, means carried by the sustaining plane at opposite sides of its axis for restoring the lateral balance of the plane, and means under the control of the aviator upon the body for shifting said balancing means relative to the sustaining plane and irrespective of the rotation of said plane about its axis.

3. An aeroplane including a body, a sustaining plane in front of the body and mounted for complete rotation about an axis extending in the direction of the line of flight, balancing planes carried by the sustaining plane at opposite sides of its center, and means extending into the body for tilting said balancing planes about an axis intersecting the line of flight and irrespective of the sustaining plane and of the movement of said plane about its axis.

4. An aeroplane including a body, a sustaining plane in front thereof and mounted for complete rotation relative thereto about an axis extending in the direction of the line of flight, balancing planes movably connected to the sustaining plane, means extending into the body for tilting said balancing planes relative to the sustaining plane about an axis intersecting the line of flight and independently of the movement of said sustaining plane about its axis, and means under the control of the aviator for holding said sustaining plane against rotation about its axis.

5. An aeroplane including a body, a sustaining plane, a bearing therefor at its center, said plane being mounted for complete rotation relative to the body and about an axis extending in the direction of flight, balancing planes carried by said sustaining plane, means under the control of the aviator for shifting said balancing planes relative to the sustaining plane and independently of the angle of adjustment of the sustaining plane, and means under the control of the aviator and embracing a portion of the bearing for holding said sustaining plane against movement relative to the body.

6. An aeroplane including a body, bearing members supported in front thereof, a sustaining plane having all portions arranged to simultaneously displace air downwardly, means upon the plane and engaging said bearing members for permitting complete rotation of the plane relative to the body, said plane being extended beyond opposite sides of the body, and a brake element embracing said means for holding the plane against rotation relative to the body.

7. An aeroplane including a body, bearing members supported in front of the body, a sustaining plane, rings carried by said plane and mounted on the bearing members, an element mounted to slide and rotate between the bearing members and relative to the body, parallel guides upon the sustaining plane, arms extending from said element and mounted upon the guides, balancing planes supported adjacent the ends of the sustaining plane, and means operated by said arms during their movement along the guides for tilting the balancing planes in opposite directions.

In testimony that I claim the foregoing as my own, I have hereto affixed my signature in the presence of two witnesses.

HOWARD FARRELL.

Witnesses:
R. HACKETT,
E. C. HOGG.